UNITED STATES PATENT OFFICE.

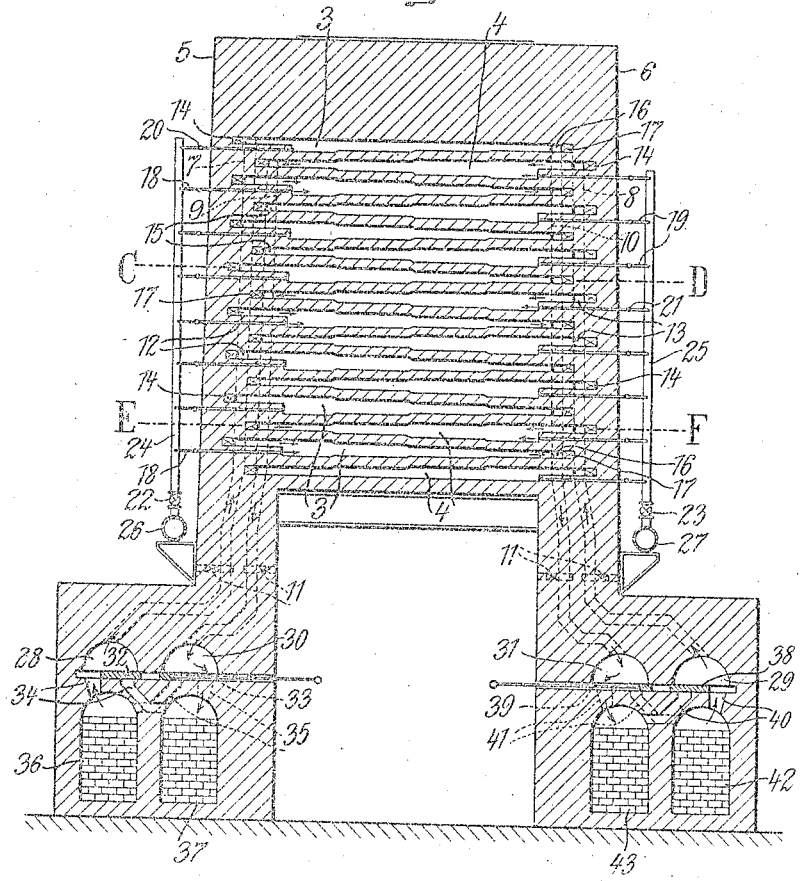
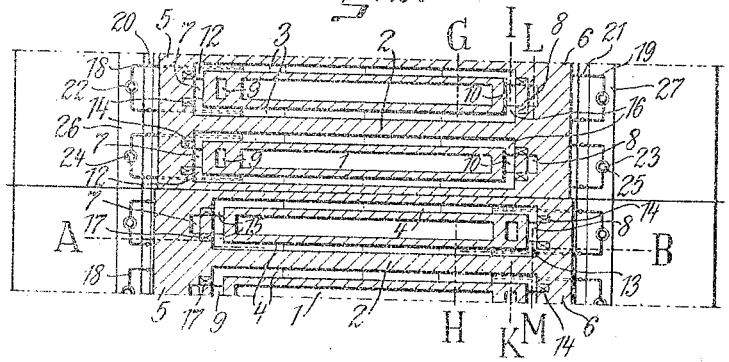

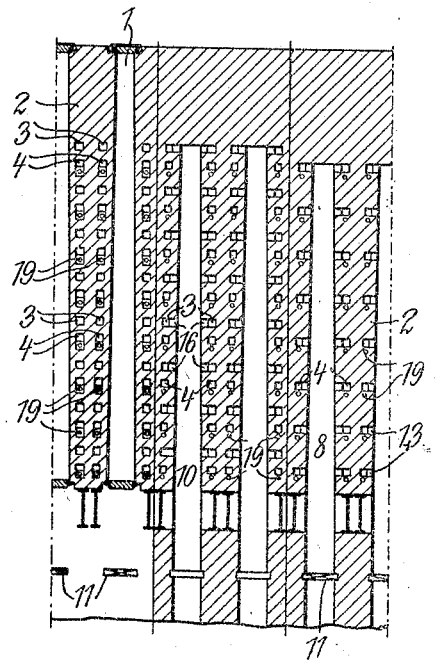

ARTHUR GOHMANN, OF STETTIN, GERMANY, ASSIGNOR TO STETTINER CHAMOTTE-FABRIK ACTIEN-GESELLSCHAFT VORM. DIDIER, OF STETTIN, GERMANY, A CORPORATION OF GERMANY.

UPRIGHT-CHAMBER OVEN.

1,058,744.  Specification of Letters Patent.  Patented Apr. 15, 1913.

Application filed November 16, 1912. Serial No. 731,714.

*To all whom it may concern:*

Be it known that I, ARTHUR GOHMANN, a subject of the German Emperor, and resident of Stettin, Germany, have invented certain new and useful Improvements in Upright-Chamber Ovens, of which the following is a specification.

Upright chamber ovens for the production of gas or coke have recently been made with chambers of as large a capacity as possible, in order to secure a maximum of economy in operation. The economical utilization of heat however imposes certain limits to the increase of the oven chambers in height and width, so that in practice, as a rule, further increase of the chamber capacity is possible only by increasing the length of the chambers in a horizontal direction. When employing upright chambers of great length, heating by means of horizontal flues through which the combustion products travel constantly in the same direction, presents considerable difficulties, in view of the material decrease of the temperature of the combustion products in the heating flues, from the fuel and air inlets to the off-gas outlets. This unfavorable temperature condition has heretofore precluded a uniform heating of the oven chambers. Even when the advantages of having the combustion products travel constantly in the same direction are sacrificed, the operation being conducted with a periodical reversal of the direction in which the combustion products flow through the heating flues, the material fall of temperature occurring in long horizontal heating flues of upright ovens can only be reduced but not avoided entirely. Again, when operating with a reversal of flame direction as above referred to, the regulating slides or dampers provided at both ends of the heating flues, serve during one period of operation for regulating the admission of air, and during the other period for regulating the escape of the off-gases and the chimney draft. Since, however, the quantity of air admitted to the heating flues differs from the amount of off-gases escaping from the said flues, it is difficult to operate the slides or dampers in such a manner as to secure a uniform heating effect.

The object of my present invention is to provide a construction of ovens having upright chambers and horizontal heating flues through which the combustion products travel always in the same direction, which will enable the oven chambers to be heated uniformly. For this purpose, the superposed horizontal or longitudinal heating flues are made to taper alternately in opposite directions, air and fuel being admitted at the wider end, while the off-gases are caused to leave at the narrower end. With this arrangement, the velocity of the combustion products is least at the admission end of each heating flue, and increases toward the outlet, such increase being either gradual or stepwise, according to the nature of the taper or contraction of the said flues. It will be evident that the amount of heat given off by the combustion products to a certain unit of surface, per unit of time, increases with the increased velocity of the current of combustion gases, and in this way I secure an effect compensating for the loss of temperature the said gases suffer on their way to the outlets of the heating flues, and am enabled to secure a practically uniform heating of those parts of the heating walls which lie between the heating flues and the gasifying chambers.

Owing to the alternating arrangement of heating flues tapering, or reduced in cross section, in opposite directions, the wide end of one heating flue will be located between the narrow ends of the two adjacent flues, the cross section of said two adjacent flues decreasing in the same direction. Thus a practically uniform heating effect is obtained on the entire surface of the heating wall, that is to say, on that portion of such surface which faces one or the other oven chamber.

A typical example of a chamber oven embodying my invention is shown in the accompanying drawing, in which—

Figure 1 is a vertical section of the oven on line A—B of Fig. 2; Fig. 2 is a horizontal section, the upper portion of said figure being taken on line C—D of Fig. 1, and the lower portion on line E—F of Fig. 1; and Fig. 3 is a vertical section on planes at right angles to that of Fig. 1, the left-hand portion of Fig. 3 being taken on line G—H of Fig. 2, the central portion on line I—K, and the right-hand portion on line L—M of Fig. 2.

The chamber oven shown in the drawings is provided with vertical or upright gasifying chambers 1. In the heating walls 2 which are interposed between adjacent chambers 1, I arrange superposed horizontal or longitudinal heating flues 3, 4. As will be seen in Figs. 2 and 3, each heating wall 2 has two sets of heating flues, each set adjacent to one of the longer sides of a gasifying chamber 1, these chambers being rectangular in cross section, with the length preferably exceeding the width considerably. In each set of heating flues 3 and 4, the flues are tapered or decrease in cross section alternately in opposite directions. Thus, as shown in Fig. 1, the lowermost heating flue may be a flue whose cross-sectional area diminishes from right to left, and immediately above this there is a heating flue 3 whose cross-sectional area diminishes from left to right, that is to say, the flues 3 contracted toward the right alternate with the flues 4 contracted toward the left. Various shapes of contracted flues may be employed, but in the example shown the contraction takes place stepwise, so that each flue comprises four portions of approximately equal length, but of different or graduated cross section, the narrowest portion being at one end of the flue and the widest portion at the other end of the flue and of the oven.

In the end walls 5, 6 of the oven I arrange adjacent to the short sides of the chambers 1, air-distributing channels 7, 8 and off-gas channels 9, 10, regulatable by means of slides or dampers 11. The air-distributing channels 7 and 8 located at opposite ends of the oven, are connected by short branch ducts 12 and 13 respectively with the wide ends of the heating flues 3 and 4 respectively which are contracted toward the other end of the oven. The quantity of air supplied to the heating flues may be regulated by means of slides 14 disposed in the branch ducts 12, 13. The off-gas channels 9, 10 arranged at each end of the oven are connected by short branch ducts 15 and 16 respectively with the narrow ends of the heating flues 4, 3 respectively. In these ducts I provide slides 17 for the purpose of regulating the amount of off-gases escaping from the heating flues, and the chimney draft. The adjustment of the slides 14, 17 may be effected from the outside through suitable, normally closed channels (not shown in the drawings).

At the wide ends of the heating flues 3, 4 are also provided connections for fuel-supply pipes or gas-supply pipes 18, 19 provided with shut-off valves 20 and 21 respectively. These fuel-supply pipes are branched off from upright feed pipes 24, 25 provided with shut-off cocks 22, 23 respectively and connected with the gas mains 26, 27 respectively.

The air-distributing channels 7 and the off-gas channels 9 at one end of the oven are connected with chambers 28 and 30 respectively, and in a like manner, at the other end of the oven, the air-distributing channels 8 and the off-gas channels 10 are connected with chambers 29 and 31 respectively. The chamber 28 may be connected with either one of two regenerators 36, 37 through passages 34, and similarly, passages 33 are provided to connect the chamber 30 with one or the other of said regenerators. A slide or damper 32, susceptible of being operated from the outside or from a tunnel, as shown, is so constructed as to close the channel 34 leading from the regenerator 37 to the chamber 28 at the time the channel 33 leading from the same regenerator to the chamber 30 is open, and vice versa. That is to say, in one position (shown in Fig. 1), the chamber 28 will be in communication with the regenerator 36, which then supplies heated air, and at the same time the chamber 30 will be in communication with the regenerator 37, which then receives hot off-gas from said chamber. Upon reversing the position of the slide 32, the off-gases will pass from the chamber 30 to the regenerator 36, while at the same time heated air will be supplied from the regenerator 37 to the chamber 28. A similar arrangement is provided at the opposite end of the oven, where two channels 40 lead from the air-supply chamber 29 to the regenerators 42 and 43 respectively, while channels 41 are adapted to connect the off-gas collecting chamber 31 alternately with the said regenerators 42 and 43, according to the position of the reversing valve 38. By operating the slides or valves 32, 38 in the well-known manner, off-gases and air for supporting combustion will be caused to travel alternately in opposite directions through each of the four regenerators, but this reversal will not affect the direction of flow in the heating flues 3, 4 and in the air-supply chambers 28 and 29, or in the off-gas collecting chambers 30 and 31, in which flues and chambers the direction of flow is always the same.

The oven described above is operated as follows: At the left-hand end of the oven (Figs. 1 and 2) the air for supporting combustion flows constantly in the same direction through the channels 7 into the wide left-hand ends of the heating flues 3. At the same end, fuel (gas) is introduced into said flues through the pipes 18. The combustion products travel through the heating flues 3 always in the same direction, from left to right, and pass off, always in the same direction, through the off-gas channels 10 at the right-hand end of the oven. On account of the absorption of heat by the walls 2, the temperature of the combustion gases decreases as they travel through the flues 3, but the linear or current velocity of the combustion gases increases owing to the reduction of the cross-sectional area as the outlets of the flues are approached. It will be obvious that as the current velocity is increased, the combustion gases will give off a greater amount of heat to the heating walls 2 per unit of time and of flue surface; it follows that the increase in current velocity will compensate for the decrease of temperature in the heating flues 3, thus securing a practically uniform heating effect at all points of the said heating flues. Substantially the same action takes place in the flues 4, except that in these the temperature decreases, and the current velocity increases, from right to left, instead of from left to right. Air for supporting combustion flows constantly in the same direction through the channels 8 located at the right-hand end of the oven and is supplied to the wide right-hand ends of the heating flues 4. Fuel (gas) is supplied to the same flue ends through the pipes 19 located at the right-hand end of the oven. The combustion products pass through the flues 4 always in the same direction, from right to left, and are conveyed away, always in the same direction, through the off-gas channels 9 located at the left-hand end of the oven. Thus the combustion gases will travel constantly in opposite directions through the heating flues 3 and 4 respectively. In view of the fact that the flues 4, like the flues 3, are contracted toward their outlets, a practically uniform heating effect will be obtained throughout the length of the flues 4, at all points thereof.

The alternate arrangement of heating flues 3, 4 tapering or contracted in opposite directions results in placing the wide end of a flue of one set (3 or 4) in the space or gap between the narrow ends of two successive or adjoining flues of the other set (4 or 3 respectively). A practically uniform heating effect is thus insured on that surface of each heating wall which faces one chamber 1 or the other.

As has been stated above, the stepwise contraction or reduction of the heating flues shown in the drawings (the height only being reduced, Fig. 1, while the width of the flues is the same from end to end, Fig. 2) is but one example of the general idea of having the flues reduced in cross-sectional area toward their outlets. This principle may be carried out in other ways, as by employing a continuous gradual or uniform contraction or taper. This modification and others may be made without departing from the nature of my invention as set forth in the appended claims.

I claim:

1. A chamber oven having upright chambers and longitudinal heating flues through which the combustion gases always travel in the same direction, said flues being superposed and contracted alternately in opposite directions, means for supplying air and fuel at the wide ends of the heating flues, and means for conveying the off-gases away from the narrow ends of said flues.

2. A chamber oven having upright chambers and longitudinal heating flues through which the combustion gases always travel in the same direction, said flues being superposed and arranged in two sets, the flues of one set alternating with those of the other set and being all contracted in the same direction, but in the opposite direction to the flues of the other set, air-distributing channels each connected with the wide ends of the flues of one set, means for supplying fuel to said wide ends, and separate off-gas channels each connected with the narrow ends of the flues of the respective set.

3. A chamber oven having chambers and parallel heating flues contracted alternately in opposite directions.

4. A chamber oven having chambers and heating flues arranged in two sets the flues of which are contracted respectively in opposite directions, the flues of one set alternating with those of the other set, and the wide end of a flue of one set being placed between the narrow ends of two successive or adjoining flues of the other set.

5. A chamber oven having chambers and heating flues arranged in two sets the flues of which are contracted respectively in opposite directions, the flues of one set alternating with those of the other set, the wide end of a flue of one set being placed between the narrow ends of two successive or adjoining flues of the other set, separate air-distributing channels each connected with the wide ends of the flues of one set, means for supplying fuel to said wide ends, and separate off-gas channels each connected with the narrow ends of the flues of the respective set.

6. A chamber oven having chambers and heating flues contracted stepwise and having portions of different cross-sectional area located in longitudinal alinement.

In testimony whereof, I have signed this specification in the presence of two subscribing witnesses.

ARTHUR GOHMANN.

Witnesses:
WALTER LANGE,
EMIL SCHMIDT.